(12) United States Patent
Jang et al.

(10) Patent No.: US 12,307,610 B2
(45) Date of Patent: May 20, 2025

(54) CONTENT SERVER AND METHOD SUPPORTING LOW-LATENCY CONTENT STREAMING

(71) Applicant: KOREA ELECTRONICS TECHNOLOGY INSTITUTE, Seongnam-si (KR)

(72) Inventors: Junhwan Jang, Goyang-si (KR); Woochool Park, Incheon (KR); Jinwook Yang, Uijeongbu-si (KR); Minsu Choi, Seoul (KR); Junsuk Lee, Seoul (KR); Bonjae Koo, Suwon-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 78 days.

(21) Appl. No.: 18/062,819

(22) Filed: Dec. 7, 2022

(65) Prior Publication Data

US 2023/0100111 A1     Mar. 30, 2023

Related U.S. Application Data

(63) Continuation of application No. PCT/KR2020/017664, filed on Dec. 4, 2020.

(30) Foreign Application Priority Data

Dec. 2, 2020   (KR) .................. 10-2020-0166229

(51) Int. Cl.
*G06T 19/00*     (2011.01)
*G06T 7/70*      (2017.01)
(Continued)

(52) U.S. Cl.
CPC .............. *G06T 19/006* (2013.01); *G06T 7/70* (2017.01); *G06T 19/20* (2013.01); *G06V 10/44* (2022.01);
(Continued)

(58) Field of Classification Search
CPC ......... G06T 19/006; G06T 7/70; G06T 19/20; G06T 2219/2004; G06T 2207/30244;
(Continued)

(56) References Cited

U.S. PATENT DOCUMENTS

2004/0064832 A1* 4/2004 Tsukidate ........... H04N 7/17354
                                                              348/E7.075
2015/0222957 A1* 8/2015 Ashbrook .......... H04N 21/4135
                                                              725/51
(Continued)

FOREIGN PATENT DOCUMENTS

KR   10-2012-0033846 A    4/2012
KR   1020150086698 A *    7/2015 ............. H04N 21/80
(Continued)

OTHER PUBLICATIONS

Kim et al., "MPEGDASH SRD based 360 VR Tiled Streaming System for Foveated Rendering", 2018 International Conference on Information and Communication Technology Convergence (ICTC) (Year: 2018).*

(Continued)

*Primary Examiner* — Michael Le
(74) *Attorney, Agent, or Firm* — Knobbe, Martens, Olson & Bear, LLP

(57) ABSTRACT

A content server and method supporting low-latency content streaming are proposed. The content server may include a communication unit and a controller. The communication unit may perform communication with a user terminal. The controller may calculate coordinates for a current user's (Continued)

location and camera pose and create a three-dimensional (3D) space by using terminal data including an image received from the user terminal upon detecting access of the user terminal. Also, the controller may position an object in the created 3D space, render a video reproduced from a user's viewpoint as a two-dimensional (2D) video, generate server data by segmenting the rendered 2D video, and transmit the generated server data to the user terminal.

8 Claims, 4 Drawing Sheets

(51) Int. Cl.
   *G06T 19/20* (2011.01)
   *G06V 10/44* (2022.01)
   *G06V 10/74* (2022.01)
   *G06V 20/40* (2022.01)
(52) U.S. Cl.
   CPC ............ *G06V 10/761* (2022.01); *G06V 20/49* (2022.01); *G06T 2219/2004* (2013.01)
(58) Field of Classification Search
   CPC .. G06T 7/579; G06T 1/20; G06T 3/00; G06T 7/73; G06V 10/44; G06V 10/761; G06V 20/49; H04N 21/816; H04N 21/218; H04N 21/222
   See application file for complete search history.

(56) References Cited

U.S. PATENT DOCUMENTS

| | | | | |
|---|---|---|---|---|
| 2016/0337426 | A1* | 11/2016 | Shribman | H04L 65/65 |
| 2017/0171347 | A1* | 6/2017 | Reeb | H04L 67/563 |
| 2017/0232344 | A1* | 8/2017 | Lim | A63F 13/65 |
| | | | | 463/31 |
| 2017/0289214 | A1* | 10/2017 | Cho | H04L 65/4015 |
| 2020/0099891 | A1* | 3/2020 | Valli | H04N 13/111 |
| 2020/0145636 | A1* | 5/2020 | Jang | H04L 65/762 |
| 2021/0035352 | A1* | 2/2021 | Harviainen | G06V 20/20 |
| 2021/0295559 | A1* | 9/2021 | Huang | H04N 23/90 |
| 2021/0345011 | A1* | 11/2021 | Kim | H04N 21/226 |

FOREIGN PATENT DOCUMENTS

| | | |
|---|---|---|
| KR | 102024551 B1 * | 9/2019 |
| KR | 10-2027172 B1 | 10/2019 |

OTHER PUBLICATIONS

International Search Report mailed Aug. 24, 2021 in International Application No. PCT/KR2020/017664.
Office Action dated Jul. 29, 2021 in Korean Application No. 10-2020-0166229.
Jang et al., "Design and Implementation of Low-Latency VR/AR Contents Streaming System based on Edge Cloud and Asynchronous Transmission Protocol", 2020, Korea Electronics Technology Institute, pp. 2492-2494.
Kim et al., "Implementation of MPEG-DASH based Low-Latency Live 360 VR Tiled Video Streaming Server", *JBE*, vol. 23, No. 4, Jul. 2018, in 10 pages.

* cited by examiner

CONTENT SERVER AND METHOD SUPPORTING LOW-LATENCY CONTENT STREAMING

CROSS REFERENCE TO RELATED APPLICATIONS

This is a continuation application of International Patent Application No. PCT/KR2020/017664, filed on Dec. 4, 2020, which claims priority to Korean patent application No. KR 10-2020-0166229 filed on Dec. 2, 2020, contents of both of which are incorporated herein by reference in their entireties.

BACKGROUND

Technical Field

The present disclosure relates to a content streaming technology, and more particularly, to a content server and method supporting low-latency content streaming by reducing a transmission delay time for realistic contents of virtual reality (VR), augmented reality (AR), or mixed reality (MR).

Description of Related Technology

With the recent increase in 5G infrastructure, realistic contents such as VR, AR, and MR are attracting attention again.

SUMMARY

One aspect is a content server and method supporting low-latency content streaming by transmitting a 2D video shown according to a user's location and viewpoint in real time and thus reducing a transmission delay time for realistic contents of virtual reality, augmented reality, or mixed reality.

Another aspect is a content server supporting low-latency content streaming that includes a communication unit performing communication with a user terminal, and a controller configured to calculate coordinates for a current user's location and camera pose and create a three-dimensional (3D) space by using terminal data including an image received from the user terminal upon detecting access of the user terminal, to position an object in the created 3D space, to render a video reproduced from a user's viewpoint as a two-dimensional (2D) video, to generate server data by segmenting the rendered 2D video, and to transmit the generated server data to the user terminal.

In addition, the controller may be configured to preprocess the image received from the user terminal.

In addition, the controller may be configured to detect feature points in a video by using the received image, to calculate information about at least one of a point-to-point distance, a camera-to-camera distance, and an angle by using the detected feature points, to repeatedly measure a distance to an object by performing triangulation based on the calculated information, and to calculate coordinates for the current user's position and camera pose by using the measured information.

In addition, the controller may be configured to position at least one object of virtual reality (VR) and augmented reality (AR) in the created 3D space.

In addition, the controller may be configured to perform the rendering in high-speed parallel processing using a plurality of graphics processing units (GPUs).

In addition, the controller may be configured to segment the 2D video by using Moving Picture Experts Group-Dynamic Adaptive Streaming over HTTP (MPEG-DASH), which is a media segmentation standard.

In addition, the terminal data may include at least one of a stereo image, inertial measurement unit (IMU) information, terminal information, and camera rotation matrix information.

Another aspect is a method for supporting low-latency content streaming that includes, at a content server, calculating coordinates for a current user's location and camera pose and creating a three-dimensional (3D) space by using terminal data including an image received from a user terminal upon detecting access of the user terminal; at the content server, positioning an object in the created 3D space; at the content server, rendering a video reproduced from a user's viewpoint as a two-dimensional (2D) video; at the content server, generating server data by segmenting the rendered 2D video; and at the content server, transmitting the generated server data to the user terminal.

The content server and method supporting low-latency content streaming according to the present disclosure does not require complicated software or high-end hardware equipment by outputting only a 2D video at the user terminal that finally outputs realistic contents.

In addition, because a physical distance between the user terminal and the content server is close, a delay time required for video transmission can be reduced.

Also, network traffic and the amount of data to be calculated can be minimized by removing unnecessary overhead through the use of an asynchronous transmission scheme.

DETAILED DESCRIPTION

Figure 1:
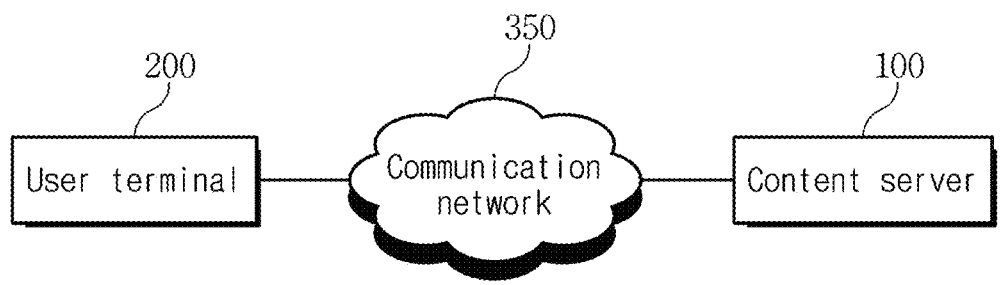
FIG. 1 is a diagram illustrating a content streaming system according to an embodiment of the present disclosure.

The slow expansion of realistic contents and related industries is caused due to high installation and maintenance costs as high-end terminal equipment is required to smoothly reproduce such contents. To solve this problem, cloud-based VR content streaming services such as Google's Stadia and NVIDIA's Geforce Now are being provided.

However, in these services, a physical distance between a terminal device and a cloud server is great, so it takes too long for a signal to reach the terminal device from the cloud server. This causes a problem in that the quality of contents consumed by the user is very low as an error between a user's input performed in the terminal device and a video generated by the cloud server increases. In addition, even if the 5G network is actively used, the cost of using the service is inevitably increased due to a high network bandwidth usage with the existing video transmission scheme.

Now, embodiments of the present disclosure will be described in detail with reference to the accompanying drawings. In the drawings, like elements are denoted by the same reference numerals. In addition, detailed descriptions of well-known functions and elements that may obscure the subject matter of the present disclosure will be omitted.

Figure 2:
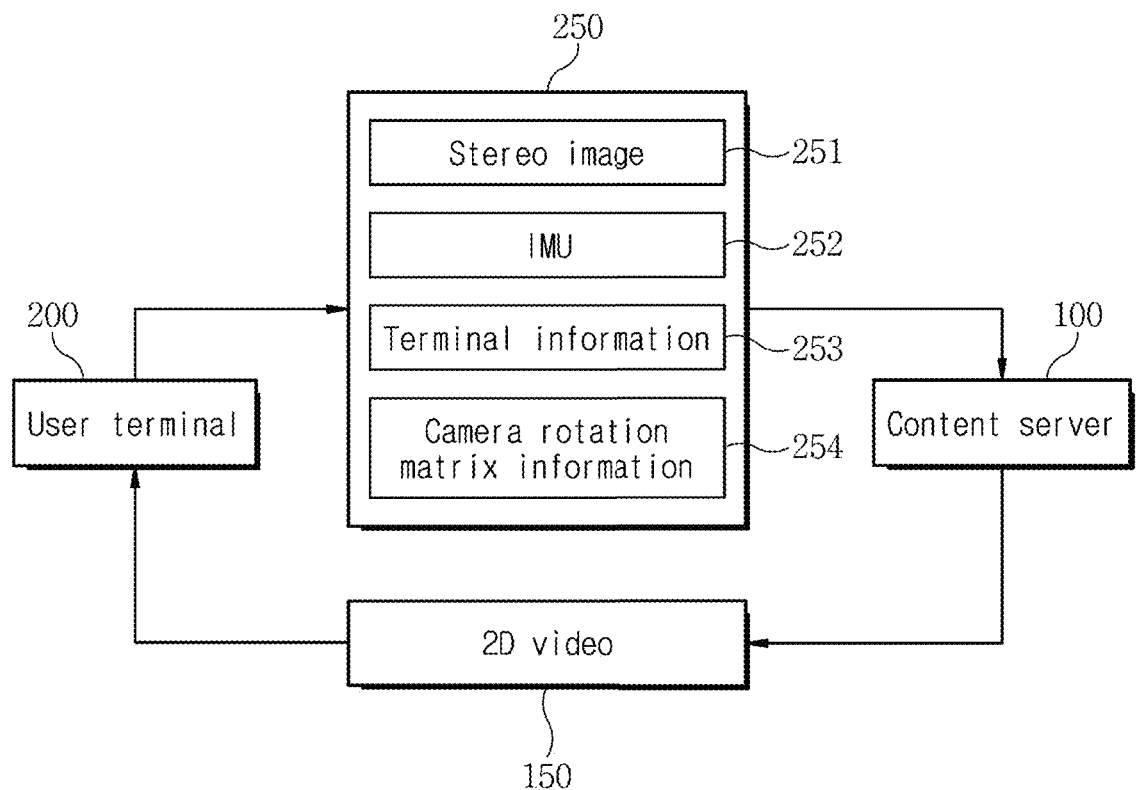
FIG. 2 is a diagram illustrating a data flow in a content streaming system according to an embodiment of the present disclosure.

FIG. 1 is a diagram illustrating a content streaming system according to an embodiment of the present disclosure, and FIG. 2 is a diagram illustrating a data flow in a content streaming system according to an embodiment of the present disclosure.

Referring to FIGS. 1 and 2, in the content streaming system 300, a user terminal 200 provides only a minimum input, and a content server 100 located in the closest position to the user terminal 200 and a communication repeater (not shown) transmits a video to the user terminal 200, so that a delay time required for video transmission can be reduced. In particular, the content streaming system 300 reduces a transmission delay time for realistic contents of virtual reality, augmented reality, or mixed reality by transmitting a 2D video shown depending on a user's location and viewpoint in real time. The content streaming system 300 includes the content server 100 and the user terminal 200.

The content server 100 communicates with the user terminal 200 and, when the access of the user terminal 200 is detected, calculates coordinates for a current user's location and camera pose and creates a three-dimensional (3D) space by using terminal data 250 received from the user terminal 200. The terminal data 250 includes at least one of a stereo image 251, inertial measurement unit (IMU) information 252, terminal information 253, and camera rotation matrix information 254. The IMU information is sensing information measured using an accelerometer, a gyroscope, a magnetometer, or an altimeter, and the terminal information is information including a camera parameter, a device model, a hardware specification, or the like. The content server 100 places an object in the created 3D space and renders a video reproduced from the user's viewpoint as a two-dimensional (2D) video. The content server 100 generates server data 150 by segmenting the rendered 2D video. The content server 100 transmits the generated server data 150 to the user terminal 150. The content server 100 performs the role of an edge server, is implemented with a computer system such as a server computer, a cluster computer, etc., and is installed in a wireless communication network relay facility to minimize a distance from the user terminal 200 receiving a service.

The user terminal 200 is an electronic device used by a user and communicates with the content server 100. The user terminal 200 accesses the content server 100 by establishing a connection to the content server 100 in response to a user's input. The user terminal 200 uses a web socket-based asynchronous connection scheme, and the connection once established is not released unless the content server 100 or the user terminal 200 terminates the connection. Also, upon accessing the content server 100, the user terminal 200 transmits the terminal data 250 to the content server 100. In this case, the user terminal 200 may not receive a response from the content server 100 whenever transmitting the terminal data 250. The user terminal 200 receives the server data 150 from the content server 100 and outputs a realistic content that is a 2D video contained in the server data 150. To this end, the user terminal 200 includes a head mounted display (HMD), AR glasses, a smartphone, a laptop, a desktop, a tablet PC, a handheld PC, and the like.

Meanwhile, the content streaming system 300 constructs a communication network 350 between the content server 100 and the user terminal 200 to enable communication therebetween. The communication network 350 may be composed of a backbone network and a subscriber network. The backbone network may be composed of one or a plurality of integrated networks among an X.25 network, a frame relay network, an ATM network, a multi-protocol label switching (MPLS) network, and a generalized multi-protocol label switching (GMPLS) network. The subscriber network may be FTTH (Fiber To The Home), ADSL (Asymmetric Digital Subscriber Line), a cable network, Zigbee, Bluetooth, Wireless LAN (IEEE 802.11b, IEEE 802.11a, IEEE 802.11g, IEEE 802.11n), Wireless Hart (ISO/IEC62591-1), ISA100.11a (ISO/IEC 62734), COAP (Constrained Application Protocol), MQTT (Multi-Client Publish/Subscribe Messaging), WiBro (Wireless Broadband), Wimax, 3G, High Speed Downlink Packet Access (HSDPA), 4G, or 5G. In some embodiments, the communication network 350 may be an Internet network or a mobile communication network. In addition, the communication network 350 may include any other well-known wireless communication or wired communication scheme to be developed in the future.

Figure 3:
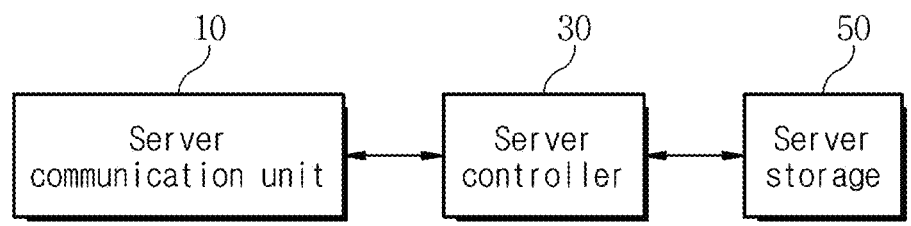
FIG. 3 is a block diagram illustrating a content server according to an embodiment of the present disclosure.
Figure 4:
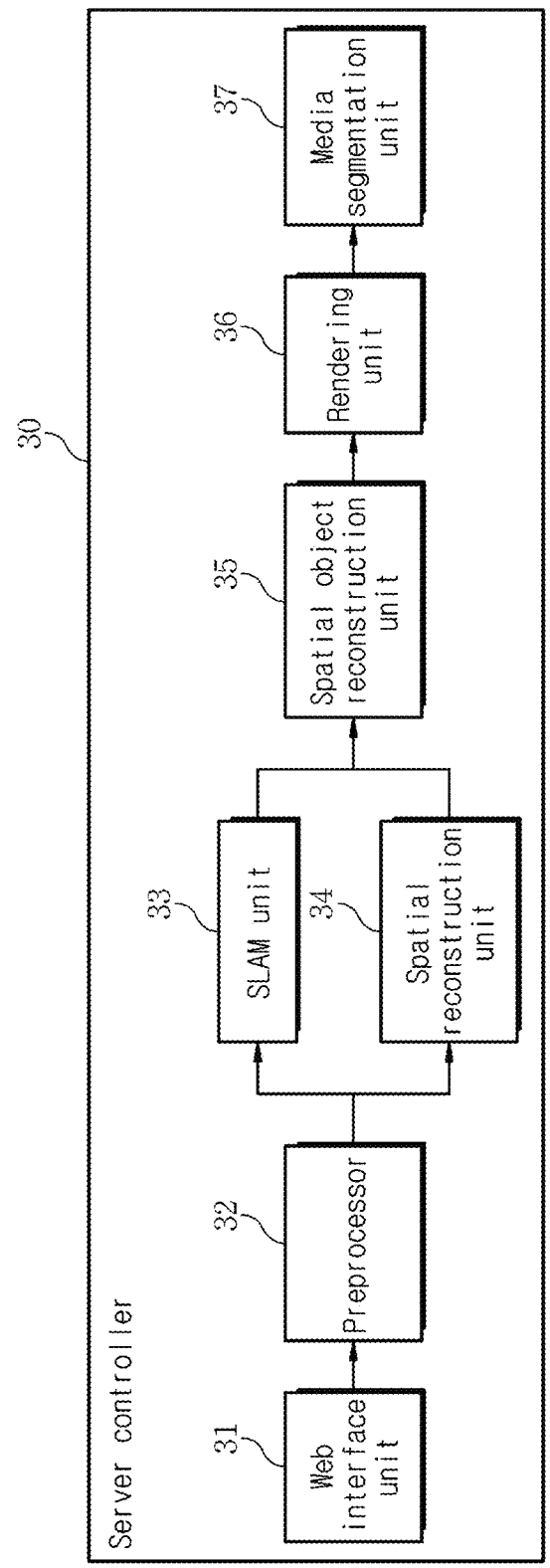
FIG. 4 is a block diagram illustrating the server controller of FIG. 3.

FIG. 3 is a block diagram illustrating a content server according to an embodiment of the present disclosure, and FIG. 4 is a block diagram illustrating the server controller of FIG. 3.

Referring to FIGS. 1 to 4, the content server 100 includes a server communication unit (or a server communication interface) 10 and a server controller 30, and may further include a server storage 50.

The server communication unit 10 performs communication with the user terminal 200. The server communication unit 10 receives the terminal data 250 from the user terminal 200 and transmits the server data 150 to the user terminal 200.

The server controller 30 performs overall control of the content server 100. The server controller 30 may reduce a delay time while reducing network overhead by using an asynchronous connection scheme with the user terminal 200. The server controller 30 includes a web interface unit 31, a preprocessor 32, a simultaneous localization and mapping (SLAM) unit 33, a spatial reconstruction unit 34, a spatial object reconstruction unit 35, a rendering unit 36, and a media segmentation unit 37.

The web interface unit 31 detects the access of the user terminal 200 and provides a service in response to detection. When an application or browser executed in the user terminal 200 accesses a service list page, the web interface unit 31 provides a list of currently provided services to the user terminal 200. When the user clicks and selects any content from the service list provided to the user terminal 200, the web interface unit 31 starts a video streaming service.

The preprocessor 32 preprocesses an image in the terminal data 250 received from the user terminal 200. Here, the image may be a stereo image. Because the received images may have different formats depending on terminals, the preprocessor 32 performs a generalization operation. Also, the preprocessor 32 filters out noise from the image and discards an invalid image. Through this, the preprocessor 32 may increase the reliability of a 2D video, which is a result generated through a process performed later.

The SLAM unit 33 measures locations and creates a map at the same time by using the preprocessed images. That is, the SLAM unit 33 detects feature points in the video and, by using the detected feature points, calculates information about at least one of a point-to-point distance, a camera-to-camera distance, and an angle. Here, the feature point may be an edge or the like. The SLAM unit 33 repeatedly measures a distance to an object by performing triangulation based on the calculated information. Using the measured information, the SLAM unit 33 may calculate coordinates for the current user's location and camera pose and thereby create a map.

The space reconstruction unit 34 generates a 3D space similar to the real world by using the preprocessed images. The spatial reconstruction unit 34 may use various algorithms for generating the 3D space.

The spatial object reconstruction unit 35 reconstructs the object in the 3D space by positioning at least one object of VR and AR in the 3D space generated by the spatial reconstruction unit 34. Here, the spatial object reconstruction unit 35 may set the position of the object based on the coordinates of the map created by the SLAM unit 33.

The rendering unit 36 renders a 3D video containing the object located in the 3D space reconstructed by the spatial object reconstruction unit 35 as a 2D video. In this case, the rendering unit 36 may render a video reproduced from the user's viewpoint as a 2D video. The rendering unit 36 may perform rendering in high-speed parallel processing using a plurality of graphics processing units (GPUs), thereby performing the rendering quickly and accurately.

The media segmentation unit 37 generates the server data 150 by segmenting the rendered 2D video and transmits the generated server data 150 to the user terminal 200. The media segmentation unit 37 may segment the 2D video by using Moving Picture Experts Group-Dynamic Adaptive Streaming over HTTP (MPEG-DASH), which is a media segmentation standard. Also, the media segmentation unit 37 may transmit the server data 150 to the user terminal 200 in a segmented order or a preset order.

The server storage 50 stores an algorithm or program for driving the content server 100. The server storage 50 stores the terminal data received from the server communication unit 10, the 3D space generated by the server controller 30, and the 3D video in which the object is located in the 3D space. If the rendered 2D video is stored, the segmented server data is stored. The server storage 50 may include at least one storage medium of a flash memory type, a hard disk type, a multimedia card micro type, a card type (e.g., SD or XD memory), a random access memory (RAM), a static RAM (SRAM), a read-only memory (ROM), a programmable ROM (PROM), an electrically erasable PROM (EEPROM), a magnetic memory, a magnetic disk, and an optical disk.

Figure 5:
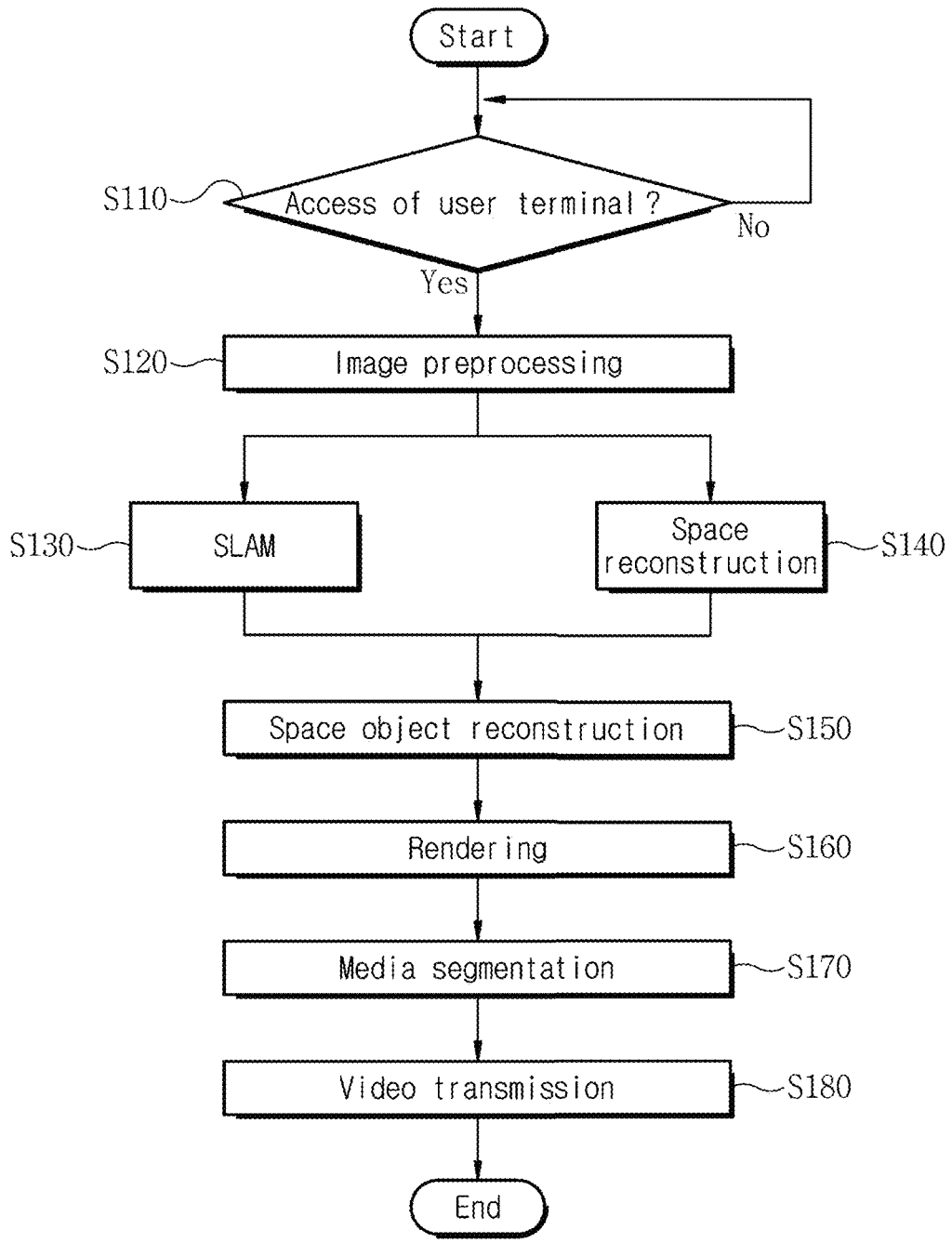
FIG. 5 is a flowchart illustrating a method for supporting content streaming according to an embodiment of the present disclosure.

FIG. 5 is a flowchart illustrating a method for supporting content streaming according to an embodiment of the present disclosure.

Referring to FIGS. 1 and 5, the method for supporting the content streaming enables only a 2D video to be outputted at the user terminal 200 that finally outputs realistic contents, thereby eliminating the need for complex software or high-end hardware equipment. The method for supporting the content streaming can minimize network traffic and the amount of data to be calculated by removing unnecessary overhead through the use of an asynchronous transmission scheme.

At step S110, the content server 100 detects an access state of the user terminal 200. The content server 100 performs step S120 in response to the access of the user terminal 200 to a video streaming service, and re-performs the step S110 in response to non-access.

At step S120, the content server 100 preprocesses an image in terminal data received from the user terminal 200. The content server 100 performs a generalization process for the image, filters out noise, and discards an invalid image.

At step S130, the content server 100 measures locations and creates a map at the same time by using the preprocessed images. The content server 100 detects feature points in the image and, by using the detected feature points, calculates information about at least one of a point-to-point distance, a camera-to-camera distance, and an angle. The content server 100 repeatedly measures a distance to an object by performing triangulation based on the calculated information. Using the measured information, the content server 100 calculates coordinates for the current user's location and camera pose and thereby creates a map.

At step S140, the content server 100 reconstructs a space by using the preprocessed images. The content server 100 creates a 3D space similar to the real world by using the preprocessed images. The content server 100 may use various algorithms for generating the 3D space.

At step S150, the content server 100 reconstructs the object in the space by using the created map and the created 3D space. The content server 100 reconstructs the object in the 3D space by positioning at least one object of VR and AR in the 3D space. Here, the content server 100 may set the position of the object based on the coordinates of the created map.

At step S160, the content server 100 renders a 3D video containing the object located in the reconstructed 3D space as a 2D video. In this case, the content server 100 may render a video reproduced from the user's viewpoint a 2D video. The content server 100 may perform rendering in high-speed parallel processing using a plurality of GPUs, thereby performing the rendering quickly and accurately.

At step S170, the content server 100 generates server data by segmenting the rendered 2D video. The content server 100 may segment the 2D video by using MPEG-DASH, which is a media segmentation standard.

At step S180, the content server 100 transmits the server data to the user terminal 200. The content server 100 may transmit the server data to the user terminal 200 in a segmented order or a preset order.

The method according to embodiments of the present disclosure may be provided in the form of a non-transitory computer-readable recording medium suitable for storing computer program instructions and data. The computer-readable recording medium may include program instructions, data files, data structures, etc. alone or in combination, and includes all kinds of recording devices in which data that can be read by a computer system is stored. The computer-readable recording medium includes a hardware device specially configured to store and execute program instructions, including magnetic media such as a hard disk, a floppy disk, and a magnetic tape, optical media such as a compact disc read only memory (CD-ROM) and a digital versatile disc (DVD), magneto-optical media such as a floptical disk, and semiconductor memories such as a read only memory (ROM), a random access memory (RAM), and a flash memory. Further, the computer-readable recording medium may be distributed over networked computer systems so that computer-readable code can be stored and executed in a distributed fashion. In addition, functional programs, associated codes, and code segments for implementing the present disclosure may be easily deduced or altered by programmers in the art to which the present disclosure belongs.

Although embodiments of the present disclosure are described above, these embodiments are exemplary only and not construed as a limitation. Various changes and modifications to the present disclosure and their equivalents can be made as well understood by those skilled in the art without departing from the technical subject matter of the present disclosure and the scope of appended claims.

What is claimed is:

1. A content server supporting low-latency content streaming, comprising:
   a communication interface configured to establish a connection with a user terminal and communicate data with the user terminal; and
   a controller configured to:
      calculate coordinates for a location of a user and camera pose and create a three-dimensional (3D) space by using terminal data including an image received from the user terminal upon detecting access of the user terminal;
      position an object in the created 3D space;
      render a video reproduced from a viewpoint of the user as a two-dimensional (2D) video;
      generate server data by segmenting the rendered 2D video; and
      transmit the generated server data to the user terminal,
   wherein the connection between the user terminal and the content server are configured to be established using a web-socket-based asynchronous connection scheme such that the connection is not released unless the content server or the user terminal terminates the connection,
   wherein the content server is configured to perform the role of an edge server to the user terminal and is configured to be selected among content servers to be closest to the user terminal, and
   wherein the controller is further configured to:
      detect the access of the user terminal based on an application or browser being executed in the user terminal accessing a service list page;
      provide a service list of currently provided services to the user terminal in response to detecting the access of the user terminal;
      initiate a video streaming service to the user terminal in response to detecting the user terminal selecting any content from the service list;
      detect feature points in a video by using the received image;
      calculate information of at least one of a point-to-point distance, a camera-to-camera distance, or an angle by using the detected feature points;
      repeatedly measure a distance to an object by performing triangulation based on the calculated information;
      calculate coordinates for the position of the user and camera pose by using the measured information; and
      segment the 2D video by using moving picture experts group-dynamic adaptive streaming over hypertext transfer protocol (HTTP) (MPEG-DASH), which is a media segmentation standard.

2. The content server of claim 1, wherein the controller is configured to preprocess the image received from the user terminal.

3. The content server of claim 1, wherein the controller is configured to position at least one object of virtual reality (VR) and augmented reality (AR) in the created 3D space.

4. The content server of claim 1, wherein the controller is configured to perform the rendering in high-speed parallel processing using a plurality of graphics processing units (GPUs).

5. The content server of claim 1, wherein the terminal data includes at least one of a stereo image, inertial measurement unit (IMU) information, terminal information, or camera rotation matrix information.

6. The content server of claim 1, wherein the content server is located in a communication network relay facility to which the user terminal is connected.

7. A method for supporting low-latency content streaming, comprising:
   establishing a connection between a content server and a user terminal using a web-socket-based asynchronous connection scheme such that the connection is not released unless the content server or the user terminal terminates the connection;
   at a controller of a content server, calculating coordinates for a current user's location and camera pose and creating a three-dimensional (3D) space by using terminal data including an image received from a user terminal upon detecting access of the user terminal, wherein the content server performs the role of an edge server to the user terminal and is selected among content servers to be closest to the user terminal;
   positioning, at the controller, an object in the created 3D space;
   rendering, at the controller, a video reproduced from a user's viewpoint as a two-dimensional (2D) video;
   generating, at the controller, server data by segmenting the rendered 2D video;
   transmitting, at a communication interface of the content server, the generated server data to the user terminal,
   detecting, at the controller, the access of the user terminal based on an application or browser being executed in the user terminal accessing a service list page;
   providing, at the controller, a service list of currently provided services to the user terminal in response to detecting the access of the user terminal;
   initiating, at the controller, a video streaming service to the user terminal in response to detecting the user terminal selecting any content from the service list;
   detecting feature points in a video by using the received image;
   calculating information of at least one of a point-to-point distance, a camera-to-camera distance, or an angle by using the detected feature points;
   repeatedly measuring a distance to an object by performing triangulation based on the calculated information;
   calculating coordinates for the position of the user and camera pose by using the measured information; and
   segmenting the 2D video by using moving picture experts group-dynamic adaptive streaming over hypertext transfer protocol (HTTP) (MPEG-DASH), which is a media segmentation standard.

8. The method of claim 7, wherein the content server is located in a communication network relay facility to which the user terminal is connected.

* * * * *